Feb. 20, 1923.

C. R. PRATT.
CHUCK.
FILED JUNE 4, 1920.

Inventor:
Charles R. Pratt,
by Emery, Booth, Janney & Varney
Att'ys.

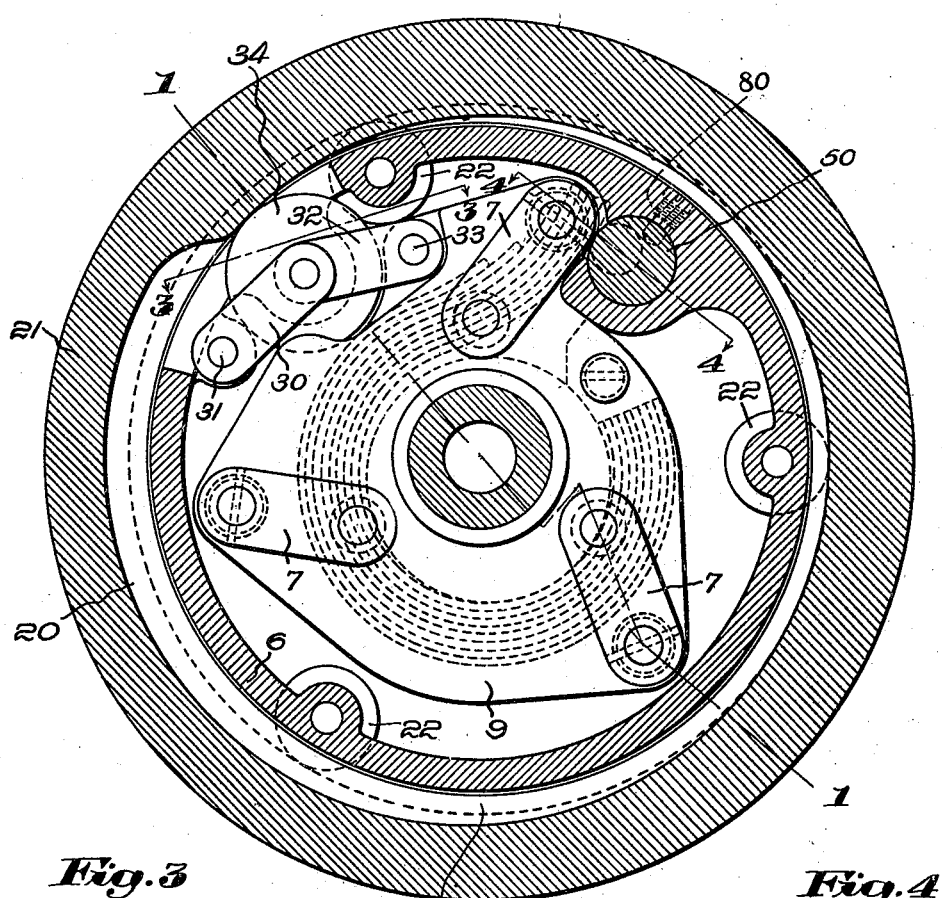

Patented Feb. 20, 1923.

1,446,064

UNITED STATES PATENT OFFICE.

CHARLES R. PRATT, OF MONTCLAIR, NEW JERSEY, ASSIGNOR TO THE E. HORTON & SON COMPANY, OF WINDSOR LOCKS, CONNECTICUT, A CORPORATION OF CONNECTICUT.

CHUCK.

Application filed June 4, 1920. Serial No. 386,494.

*To all whom it may concern:*

Be it known that I, CHARLES R. PRATT, a citizen of the United States, and a resident of Montclair, in the county of Essex, State of New Jersey, have invented an Improvement in Chucks, of which the following description, in connection with the accompanying drawings, is a specification, like characters on the drawings representing like parts.

This invention pertains to improvements in chucks and more particularly, though not exclusively, to improvements in work-holding chucks for lathes and the like.

It is among the objects of the invention to provide an efficient chuck of simple construction.

In the drawings which show a preferred form of one illustrative embodiment of my invention:—

Fig. 2 is a section on the lines 2—2 of Fig. 1, being partly in elevation;

Fig. 3 is a view partly in section on the line 3—3 of Fig. 2; and

Fig. 4 is a view partly in section on the line 4—4 of Fig. 2.

Figure 1:
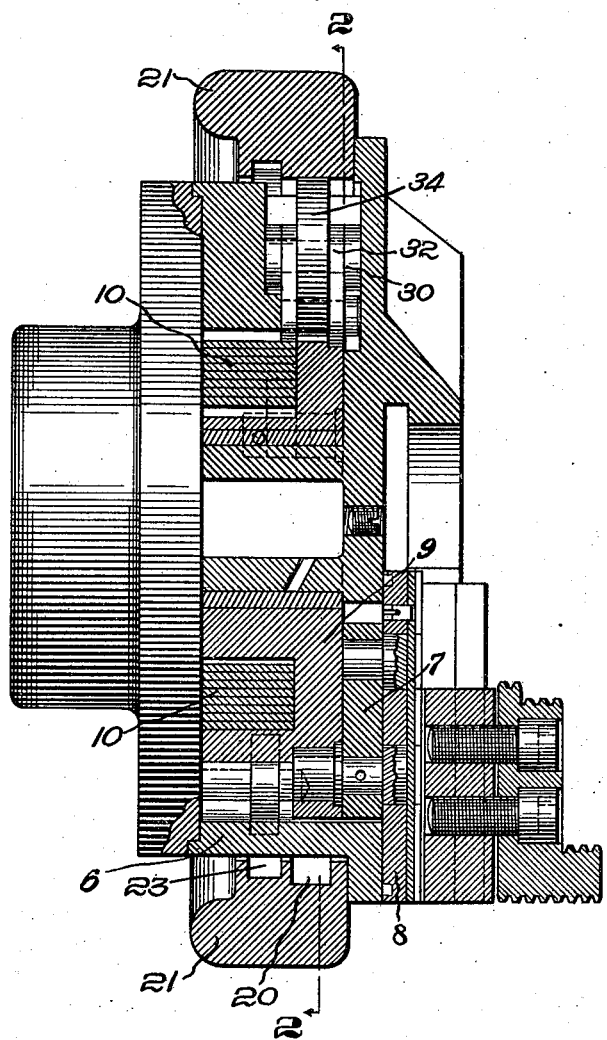
Figure 1 is a section through a chuck on the lines 1—1 of Fig. 2, being partly in elevation.

Referring to the drawings and to the preferred form of my invention selected for illustrative purposes, I have shown a chuck of the general type shown in my co-pending application Serial No. 386,493, filed herewith, improved in various respects and supplied with a preferred form of mechanism permitting ready opening and closing of the jaws without the use of a wrench as is used in said co-pending application, and permitting opening and closing of the jaws of the chuck while the chuck is rotating.

In the chuck illustrated, the chuck body 6 carries any suitable number of jaws, herein shown as three adapted to be moved to or from the work by toggles 7, connecting the jaw slides 8 and oscillatory spider 9 as shown in the application referred to. The spider 9 may be urged in a direction to move the jaws in work-engaging direction by spring means, herein shown as a spring 10, which may be identical with that shown and described in said co-pending application.

In said application, the spider 9 was oscillated in work-releasing direction by screw mechanism. In the preferred form of my invention shown in the drawings of the present application, the spider is actuated in work-releasing direction by cam means herein typified by the internal cam surface 20 of a cam ring 21 surrounding the body of the chuck and rotatable thereabout, preferably being journalled thereon by rollers 22 carried by the chuck body 6 and tracking in a groove 23 in the ring 21.

Between the cam surface 20 and the spider 9, I interpose any suitable transmission mechanism which preferably, as shown, includes a toggle having one of its mmebers 30 pivoted at 31 to the chuck body and the other toggle member 32 pivoted at 33 to the spider and carrying between the toggle members a toggle roll 34 running on the cam surface 20.

The spider 9 is oscillated by relative rotation of the chuck body 6 and cam ring 21. When the chuck is rotated by the lathe spindle in a contra-clockwise direction, as viewed in Fig. 2, relative rotation of chuck body and ring may be conveniently effected by retarding or stopping rotation of the cam ring 21, by the hand of the operator or any suitable brake mechanism.

The interior bore of the cam ring 21 is preferably sufficiently large to provide a clearance between the inside of this ring and the outside of the peripheral flange 6 on the chuck body, so that if the ring 21 is at any time slightly distorted by reason of the bearing of the roller 34 thereagainst under spring pressure the binding effect of the ring on the chuck body will be minimized.

The spring 10 always urging the spider in a contra-clockwise direction relative to the chuck body will, acting through the toggles 30, 32, always urge the toggle roller 34 toward the cam surface 20. When the toggle roller 34 is in the position relative to the cam shown in Fig. 2, the jaws are retracted from the work. A slight relative rotation of the cam ring 21 relative to the chuck body will permit the toggle members 30, 32 to assume a position of greater angularity and permit the spring 10 to oscillate the spider in a contra-clockwise direction until the chuck jaws grip the work. When it is desired to have the work released, the cam ring 21 is manipulated as by braking with the hand if the lathe spindle is running, or by turning in a clockwise direction relative to the chuck body as viewed in Fig. 2, if the chuck is not rotating. This causes the toggle roller 34 to be pressed toward the axis of the chuck body by the portions of the cam surface 20 which form the smaller diameter portions of the scroll, thereby straightening the toggle links 30, 32 and producing oscillation of the spider 9 relative to the chuck body in a clockwise direction, against the pressure of the spring 10, thereby causing work-releasing movement of the chuck jaws.

The chuck illustrated may be changed from internal to external chucking and vice versa in the same general manner described in my co-pending application by reversal of the toggle connections.

The eccentric means 50 shown in Figs. 2 and 4 provides for initial stressing of the spring member 10, taking the place of the spring tension adjusting screw shown in my co-pending application. While useful in other forms of chucks, this mechanism is peculiarly useful in chucks of the preferred construction illustrated, because adjustment may be effected from the face of the chuck, by any suitable key or wrench, thus avoiding interference with the cam ring which would occur if the screw adjustment were used. The eccentric 50 may be maintained in adjusted position by entering a screw pin 80 in any one of the holes 81 in the eccentric 50. The screw pin 80 may enter from the periphery of the chuck body forwardly of the cam ring. The detail of the eccentric construction is shown in Fig. 4.

In operation at speed the hand wheel on the cam ring 21 offers a smooth polished surface for the palm, thumb and fingers of the operator's left hand to take a sliding grip while the chuck is revolving at speed, and a relatively light retarding force, preferably between ten and thirty-three pounds, opens the jaws and allows the work to fall out or be removed; when the new work is placed in the jaws a similar sliding grip on the handwheel closes the jaws. The operator should release the handwheel as soon as the work is released, and as soon as the jaws grip the new work. The instant the jaws close on the work, the operator will feel the torque on the handwheel cease, and should let go of the handwheel, giving it, if desired, a spin in the direction of rotation of the work to insure location of the toggle roller in the deepest portion of the cam path.

The preferred form of my invention provides adjustable jaw pressure from the lightest for frail work to the heaviest for heavy work, the pressure once adjusted being substantially uniform and this preferably notwithstanding variations, within limits, of the diameter of the work gripped. The jaw pressure being resiliently actuated, provides "follow up" in case of heat expansion of work internally chucked, and prevents jarring loose on intermittent cutting.

On second operation work, where the top jaws are turned in place to fit the work, the chuck illustrated is exceedingly accurate, no independent jaw adjustment being provided for and the eccentric error being eliminated.

An operator, no matter how unskilled, cannot strain the chuck illustrated because he cannot under any circumstances apply strains greater than the maximum provided by the spring, and the chuck is proportioned to stand this strain.

All power transmission parts of the chuck illustrated are on rolling or pivot bearings, and the body is packed with lubricant. The efficiency is therefore much greater than in chucks wherein power is applied through scrolls, screws, etc.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

1. A chuck comprising, in combination, a plurality of jaws, a spider carrying said jaws, spring means urging said spider in a direction to move said jaws toward the work, and cam means for oscillating said spider to draw said jaws from the work against the pressure of said spring means.

2. A chuck comprising, in combination, a body, a plurality of jaws, spring means urging said jaws toward the work, and cam means for distorting said spring means to draw said jaws from the work, said cam means movable through an indefinite number of revolutions relative to the chuck body.

3. A chuck comprising, in combination, a body, a plurality of jaws, spring means urging said jaws toward the work, and cam means presenting a cam surface extending through more than 180° relative to the axis of the chuck for distorting said spring means to draw said jaws from the work, said cam means rotatable relative to the chuck body.

4. A chuck comprising, in combination, a body, a plurality of jaws, spring means urging said jaws toward the work, and cam means mounted for complete revolution relative to the body of the chuck, rotation of said cam means in a single direction relative to the body of the chuck effecting distortion of said spring and permitting reaction thereof, thereby to move said jaws in both work-engaging and work-disengaging directions.

5. A chuck comprising, in combination, a body, jaws, oscillatory means, toggles between said oscillatory means and said jaws whereby oscillation of said oscillatory means actuates said jaws, spring means effecting oscillation of said oscillatory means in one direction and means effecting by cam action oscillation thereof in the other direction.

6. A chuck comprising, in combination, a body, jaws, oscillatory means, toggles between said oscillatory means and said jaws whereby oscillation of said oscillatory means actuates said jaws, spring means effecting oscillation of said oscillatory means in one direction and toggle means effecting oscillation thereof in the other direction.

7. A chuck comprising, in combination, a body, jaws, oscillatory means, toggles between said oscillatory means and said jaws whereby oscillation of said oscillatory means actuates said jaws, spring means effecting oscillation of said oscillatory means in one direction and cam and toggle means effecting oscillation thereof in the other direction.

8. A chuck comprising, in combination, a body, jaws, spring means actuating said jaws in work-engaging direction and cam means actuating said jaws in the opposite direction, said cam means formed as a ring presenting a continuous inner cam surface rotatable relative to said body.

9. A chuck comprising, in combination, a body, jaws, spring means actuating said jaws in work-engaging direction and cam means actuating said jaws in the opposite direction, said cam means formed as a ring presenting a continuous inner cam surface rotatable relative to said body and surrounding said body.

10. A chuck comprising, in combination, a body, jaws, spring means actuating said jaws in work-engaging direction, cam means effecting distortion of said spring and moving said jaws in work-disengaging direction, and toggle means operatively interposed between said cam means and spring, said toggle means organized and operating to supply an increasing leverage as the resistance to distortion of said spring is increased by progressive flexing of said spring.

11. A chuck comprising, in combination, a body, jaws, spring means actuating said jaws in work-engaging direction, cam means actuating distortion of said spring and moving said jaws in work-disengaging direction, and toggle means operatively interposed between said cam means and spring, said toggle means organized and operating to supply an increasing leverage as the resistance to distortion of said spring is increased by progressive flexing of said spring whereby substantially uniform torque on the cam means is maintained during distortion of said spring.

12. A chuck comprising, in combination, a body, jaws, and cam means actuating said jaws, a ring surrounding said body, said cam means presenting a generally spiral single continuous cam surface on the interior surface of said ring and said ring held against movement in a direction axial of said chuck.

13. A chuck comprising, in combination, a body, jaws, and cam means actuating said jaws, a ring surrounding said body, said cam means presenting a generally spiral single continuous cam surface on the interior surface of said ring, said ring also providing an interior surface concentric with the chuck body, and providing, in cooperation with a contiguous surface of said body, a bearing on which said ring may rotate relative to said body, said ring held against movement in a direction axial of said chuck.

14. A chuck comprising, in combination, a body having a face portion and a peripheral flange, a ring surrounding said body, said ring providing a single continuous internal cam surface, jaws, and a roller projecting beyond said peripheral flange for engagement with said cam surface for actuating said jaws.

15. A chuck comprising, in combination, a body having a face portion and a peripheral flange, a ring surrounding said body, said ring providing an internal cam surface, jaws, and means projecting beyond said peripheral flange for engagement with said cam surface for actuating said jaws, and antifriction spacing means between said flange and a bearing surface on the interior of said ring, said bearing surface spaced from said peripheral flange to permit slight distortion of said ring, while minimizing the binding effect of such distortion.

16. A chuck comprising, in combination, a body, jaws, a spider, a cantilever spring actuating said jaws toward the work, said spring acting between said spider and said body, and means including an eccentric bearing against the end of said spring and adapted as it is turned about its axis to provide a pluarlity of different degrees of initial stress between said spider and body to regulate the degree of spring-actuated jaw pressure delivered to work of determined diameter.

In testimony whereof, I have signed my name to this specification.

CHARLES R. PRATT.